US012467767B2

(12) United States Patent
Lee et al.

(10) Patent No.: US 12,467,767 B2
(45) Date of Patent: Nov. 11, 2025

(54) ULTRASONIC WAVE-BASED INDOOR INERTIAL NAVIGATION MAPPING METHOD AND SYSTEM

(71) Applicants: China Beacons Institute, Ningbo (CN); University of Nottingham Ningbo China, Ningbo (CN)

(72) Inventors: Boon Giin Lee, Ningbo (CN); Renjie Wu, Ningbo (CN); Matthew Pike, Ningbo (CN)

(73) Assignees: China Beacons Institute, Ningbo (CN); University of Nottingham Ningbo China, Ningbo (CN)

( * ) Notice: Subject to any disclaimer, the term of this patent is extended or adjusted under 35 U.S.C. 154(b) by 355 days.

(21) Appl. No.: 18/112,143

(22) Filed: Feb. 21, 2023

(65) Prior Publication Data

US 2023/0288224 A1    Sep. 14, 2023

(30) Foreign Application Priority Data

Mar. 8, 2022    (CN) .......................... 202210220368.3

(51) Int. Cl.
*G01C 21/00*    (2006.01)
(52) U.S. Cl.
CPC ....... *G01C 21/383* (2020.08); *G01C 21/3844* (2020.08)
(58) Field of Classification Search
CPC .... G01C 21/383; G01C 21/3844; G01C 5/06; G01C 21/005; G01C 21/1654; G01C 21/1652; G01C 21/206; G01C 21/165; G01C 21/3848; Y02D 30/70
See application file for complete search history.

(56) References Cited

U.S. PATENT DOCUMENTS

| | | | |
|---|---|---|---|
| 2012/0173204 A1* | 7/2012 | Padmanabhan | G01S 15/89 703/1 |
| 2012/0232795 A1* | 9/2012 | Robertson | G01C 21/3837 706/46 |

(Continued)

FOREIGN PATENT DOCUMENTS

| | | | | |
|---|---|---|---|---|
| CN | 103968827 B | * | 11/2017 | ........... G01C 21/165 |
| CN | 105115497 B | * | 7/2018 | ........... G01C 21/005 |
| CN | 109099926 A | * | 12/2018 | ........... G01C 21/165 |
| WO | WO-2008035827 A1 | * | 3/2008 | ............. G01C 21/12 |

OTHER PUBLICATIONS

Machine Translation: CN-105115497-B (Year: 2018).*

(Continued)

*Primary Examiner* — Anne Marie Antonucci
*Assistant Examiner* — Connor L Knight
(74) *Attorney, Agent, or Firm* — Howard IP Law Group PC

(57) ABSTRACT

An ultrasonic wave-based indoor inertial navigation mapping method and system are disclosed. The method includes: acquiring inertial navigation data, ultrasonic data, and altitude data of a person for each step; determining a landing point position of a corresponding footstep according to the inertial navigation data and the altitude data, and connecting all landing point positions to obtain a reference trajectory; determining various initial ultrasonic map points according to the reference trajectory and the ultrasonic data for each step, where feature data of each initial ultrasonic map point is recorded and stored; acquiring current initial ultrasonic map points and current feature data corresponding to a current footstep; and comparing the current feature data with all recorded and stored feature data, and fusing the current initial ultrasonic map points with various initial ultrasonic map points with similar features by a particle filter algorithm if a preset condition is satisfied.

8 Claims, 4 Drawing Sheets

(56) References Cited

U.S. PATENT DOCUMENTS

| | | | | |
|---|---|---|---|---|
| 2013/0124081 | A1* | 5/2013 | Khosravy | H04W 4/029 |
| | | | | 701/408 |
| 2013/0332064 | A1* | 12/2013 | Funk | G01C 21/1652 |
| | | | | 701/409 |
| 2017/0339524 | A1* | 11/2017 | Cho | H04W 4/80 |
| 2021/0027599 | A1* | 1/2021 | Chan | G08B 7/06 |
| 2021/0275098 | A1* | 9/2021 | Tian | G06F 3/011 |
| 2023/0077909 | A1* | 3/2023 | Arnicar | G01C 21/3819 |
| | | | | 701/23 |
| 2024/0346906 | A1* | 10/2024 | Gorsuch | G01C 21/206 |

OTHER PUBLICATIONS

Machine Translation: CN-109099926-A (Year: 2018).*
Machine Translation: CN-103968827-B (Year: 2017).*
Girard et al., Indoor Pedestrian Navigation Using Foot-Mounted IMU and Portable Ultrasound Range Sensors, MDPI, pp. 7606-7624 (Year: 2011).*
Krach et al., Integration of Foot-Mounted Inertial Sensors into a Bayesian Location Estimation Framework, WPNC, pp. 55-61 (Year: 2008).*
Xia et al., Performance Enhancement of Pedestrian Navigation Systems Based on Low-Cost Foot-Mounted MEMS-IMU/ Ultrasonic Sensor, MDPI, pp. 1-19 (Year: 2019).*
First Office Action received in the CN Application No. 202210220368.3, mailed on Jul. 27, 2023, 8 pages.

* cited by examiner

ULTRASONIC WAVE-BASED INDOOR INERTIAL NAVIGATION MAPPING METHOD AND SYSTEM

CROSS-REFERENCE TO RELATED APPLICATION

This patent application claims the benefit and priority of Chinese Patent Application No. 202210220368.3 filed with the China National Intellectual Property Administration on Mar. 8, 2022, the disclosure of which is incorporated by reference herein in its entirety as part of the present application.

TECHNICAL FIELD

The embodiments of the present disclosure relate to the technical field of navigation planning, in particular to an ultrasonic wave-based indoor inertial navigation mapping method and system.

BACKGROUND

An indoor mapping technology is a main means for indoor structure modeling, which is widely used in building interior modeling, as a plane visualization reference of an indoor technology, and meanwhile, has a broad application prospect in emergency scenes, including indoor disaster rescue such as fire, and mine tunnel collapse. A clear indoor map can provide critical information reference for rescue force allocation, personal safety guarantee, and follow-up support work, and effectively reduce the loss of life and property caused by unexpected situations.

The existing indoor mapping solutions include: structural modeling based on a visual sensor, which performs video frame splicing and spatial combination by using feature points captured by vision; scanning modeling based on a lidar, which performs point cloud structure modeling and fusing by using laser to actively scan the surrounding environment; and surveying and mapping modeling based on a Computer-Aided Design (CAD) and a total station, which performs measurement modeling on fine structure data of indoor structures, such as a wall, a door, and a corridor, by using laser ranging, visual aid, and known structure information.

However, a visual sensor and a laser sensor cannot capture surrounding environment information very well in harsh environment full of smoke, dust, ignition points, and darkness, such as fire environment and an underground mine, which directly leads to the reduction of mapping accuracy or total mapping failure. Meanwhile, the mapping method through precision scanning calculation requires a high-performance computing platform, and a surveying and mapping solution requires long post-processing time, so it is not suitable for use in emergency situations such as rescue.

SUMMARY

The present disclosure provides an ultrasonic wave-based indoor inertial navigation mapping method and system, which realizes the construction of an indoor map, provides a clear indoor traveling trajectory map for personnel in harsh environments such as a fire room and mine tunnel collapse, and protects the life safety of the personnel, and in turn ensure smooth running of a rescue work.

In a first aspect, the embodiments of the present disclosure provide an ultrasonic wave-based indoor inertial navigation mapping method, which is performed by an ultrasonic wave-based indoor inertial navigation mapping system. The mapping system includes: a first inertial navigation module, a first ultrasonic ranging module, a first air pressure detection module, a first control module, and a first wireless communication module arranged at a left foot of a person; a second inertial navigation module, a second ultrasonic ranging module, a second air pressure detection module, a second control module, and a second wireless communication module arranged at a right foot of a person; and a terminal module, connected to the first control module through the first wireless communications module, and connected to the second control module through the second wireless communications module.

The mapping method includes:
acquiring inertial navigation data, ultrasonic data, and altitude data of the person for each step;
determining a landing point position of a corresponding footstep according to the inertial navigation data and the altitude data for each step, and connecting all landing point positions to obtain a reference trajectory;
determining each initial ultrasonic map point according to the reference trajectory and the ultrasonic data for each step, where each initial ultrasonic map point corresponds to a piece of feature data; and the feature data of each initial ultrasonic map point is recorded and stored;
acquiring a current initial ultrasonic map point and current feature data corresponding to a current footstep; and
comparing the current feature data with all recorded and stored feature data, and fusing the current initial ultrasonic map point with various initial ultrasonic map points with similar features by a particle filter algorithm when a preset condition is satisfied.

Optionally, the feature data at least includes atmospheric pressure data and magnetic fingerprint feature data. The magnetic fingerprint feature data includes motion logic feature data and topology structure data.

Optionally, the comparing the current feature data with all recorded and stored feature data includes:
determining whether atmospheric pressure data of the current feature data is matched with atmospheric pressure data of all recorded and stored feature data; on the condition that the atmospheric pressure data of the current feature data is matched with the atmospheric pressure data of all recorded and stored feature data, determining whether magnetic fingerprint feature data of the current feature data is matched with magnetic fingerprint feature data of all recorded and stored feature data; on the condition that the magnetic fingerprint feature data of the current feature data is matched with the magnetic fingerprint feature data of all recorded and stored feature data, determining whether motion logic feature data and topology structure data of the current feature data satisfy a preset condition; and if the preset condition is satisfied, fusing the current initial ultrasonic map point with various initial ultrasonic map points with similar features by the particle filter algorithm.

Optionally, the atmospheric pressure data includes first atmospheric pressure data acquired by the first air pressure detection module and second atmospheric pressure data acquired by the second air pressure detection module.

Optionally, the first inertial navigation module at least includes a first magnetometer. The second inertial navigation module at least includes a second magnetometer. The magnetic fingerprint feature data includes first magnetic fingerprint feature data acquired by the first magnetometer and second magnetic fingerprint feature data acquired by the second magnetometer.

Optionally, the first inertial navigation module at least includes a first accelerometer and a first gyroscope. The second inertial navigation module at least includes a second accelerometer and a second gyroscope.

The inertial navigation data includes acceleration data and gyroscope data. The acceleration data includes a first acceleration acquired by the first accelerometer and a second acceleration acquired by the second accelerometer. The gyroscope data includes first gyroscope data acquired by the first gyroscope the second gyroscope data acquired by the second gyroscope.

The determining the landing point position of the corresponding footstep according to the inertial navigation data and the altitude data for each step includes:
  determining step length according to the acceleration data for each step;
  determining a walking direction according to the gyroscope data for each step; and
  determining a landing point position of each step according to the step length for each step, the walking direction for each step, and the altitude data for each step.

Further, the ultrasonic data for each step includes: first ultrasonic data acquired by the first ultrasonic ranging module and second ultrasonic data acquired by the second ultrasonic ranging module.

The determining each initial ultrasonic map point according to the reference trajectory and the ultrasonic data for each step includes:
  fusing the reference trajectory and the first ultrasonic data for each step to obtain an initial ultrasonic map point of the left foot of the person for each step; and
  fusing the reference trajectory and the second ultrasonic data for each step to obtain an initial ultrasonic map point of the right foot of the person for each step.

Optionally, the method further includes visualizing all initial map points, after comparing the current feature data with all recorded and stored feature data, Optionally, the inertial navigation data and the altitude data for each step include: first inertial navigation data acquired by the first inertial navigation module and first altitude data acquired by the first air pressure detection module on the left foot of the person; and second inertial navigation data acquired by the second inertial navigation module and second altitude data acquired by the second air pressure detection module on the right foot of the person.

In a second aspect, the embodiments of the present disclosure further provide an ultrasonic wave-based indoor inertial navigation mapping system, which includes: a first inertial navigation module, a first ultrasonic ranging module, a first air pressure detection module, a first control module, and a first wireless communication module arranged at a left foot of a person; a second inertial navigation module, a second ultrasonic ranging module, a second air pressure detection module, a second control module, and a second wireless communication module arranged at a right foot of a person; and a terminal module, connected to the first control module through the first wireless communications module, and connected to the second control module through the second wireless communications module.

The terminal module is configured for: acquiring inertial navigation data, ultrasonic data, and altitude data of the person for each step;
  determining a landing point position of a corresponding footstep according to the inertial navigation data and the altitude data for each step, and connecting all landing point positions to obtain a reference trajectory;
  determining each initial ultrasonic map point according to the reference trajectory and the ultrasonic data for each step, where each initial ultrasonic map point corresponds to a piece of feature data; and the feature data of each initial ultrasonic map point is recorded and stored;
  acquiring a current initial ultrasonic map point and current feature data corresponding to a
  current footstep; and
  comparing the current feature data with all recorded and stored feature data, and fusing the current initial ultrasonic map point with various initial ultrasonic map points with similar features by a particle filter algorithm if a preset condition is satisfied.

The present disclosure provides an ultrasonic wave-based indoor inertial navigation mapping method and system. The method is performed by the ultrasonic wave-based indoor inertial navigation mapping system. The mapping system includes: a first inertial navigation module, a first ultrasonic ranging module, a first air pressure detection module, a first control module, and a first wireless communication module arranged at a left foot of a person; a second inertial navigation module, a second ultrasonic ranging module, a second air pressure detection module, a second control module, and a second wireless communication module arranged at a right foot of a person; and a terminal module, connected to the first control module through the first wireless communication module, and connected to the second control module through the second wireless communication module. The method includes: acquiring inertial navigation data, ultrasonic data, and altitude data of a person for each step; determining a landing point position of a corresponding footstep according to the inertial navigation data and the altitude data for each step, and connecting all landing point positions to obtain a reference trajectory; determining each initial ultrasonic map point according to the reference trajectory and the ultrasonic data for each step, where each initial ultrasonic map point corresponds to feature data; the feature data of each initial ultrasonic map point is recorded and stored; acquiring a current initial ultrasonic map point and current feature data corresponding to a current footstep; and comparing the current feature data with all recorded and stored feature data, and fusing the current initial ultrasonic map point with various initial ultrasonic map points with similar features by a particle filter algorithm if a preset condition is satisfied. By the method, an indoor map can be constructed, a clear indoor traveling trajectory map can be provided for people in harsh environment such as a fire room and mine tunnel collapse, so as to guarantee the life safety of the personnel, and in turn ensure smooth running of a rescue work.

DETAILED DESCRIPTION OF THE EMBODIMENTS

Figure 1:
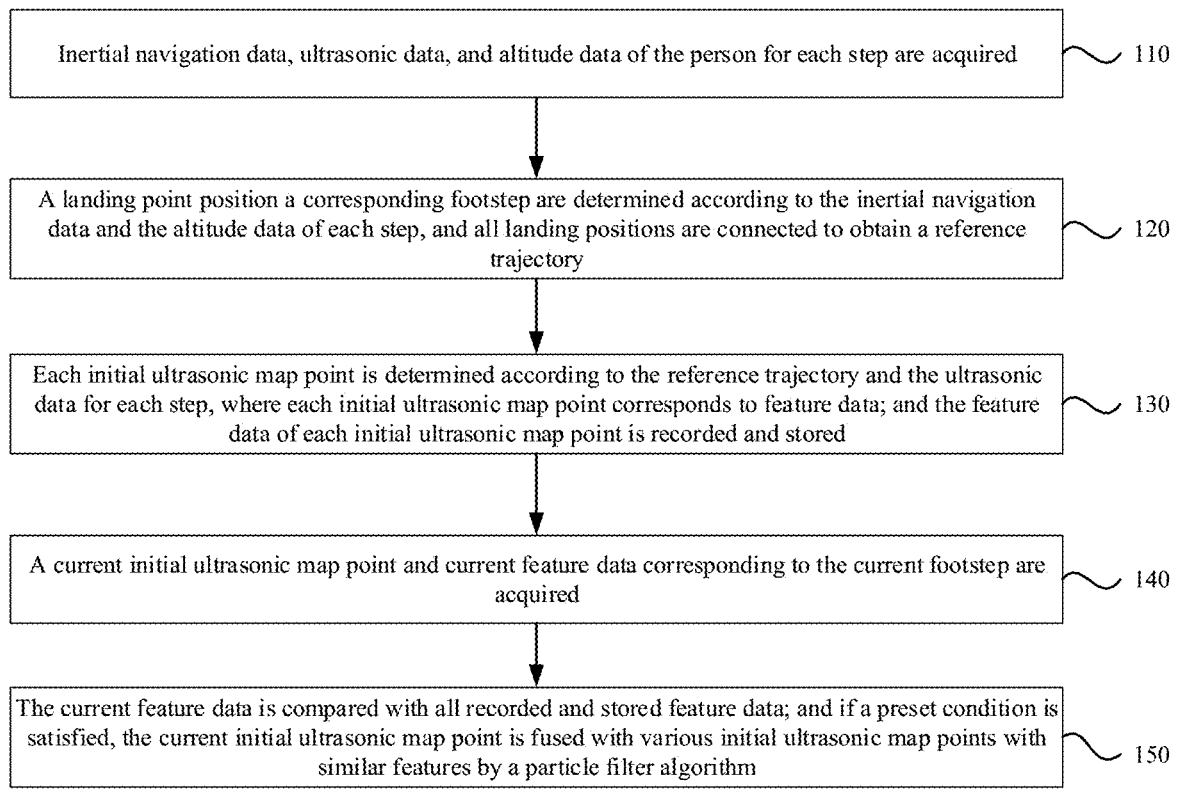
FIG. 1 is a flowchart of an ultrasonic wave-based indoor inertial navigation mapping method in an embodiment of the present disclosure.

The present disclosure will be further described in detail below with reference to the accompanying drawings and embodiments. It can be understood that the specific embodiments described herein are merely illustrative of the present disclosure and are not intended to limit the present disclosure. In addition, it is also to be noted that, for convenience of description, only some but not all of the structures related to the present disclosure are shown in the drawings.

Figure 2:
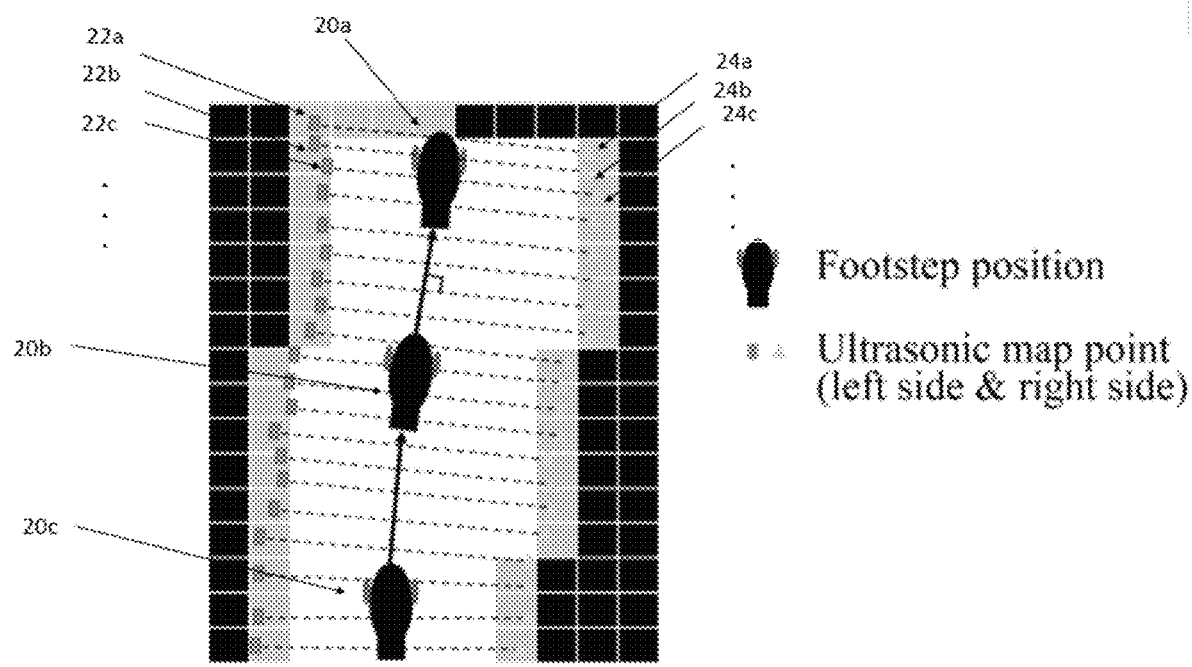
FIG. 2 is a schematic diagram of a reference trajectory and initial ultrasonic map points in the embodiment of the present disclosure.

FIG. 1 is a flowchart of an ultrasonic wave-based indoor inertial navigation mapping method in an embodiment of the present disclosure. FIG. 2 is a schematic diagram of a reference trajectory and initial ultrasonic map points in the embodiment of the present disclosure. The present embodiment is suitable for an implementation process of an ultrasonic wave-based indoor inertial navigation mapping method. The method may be performed by an ultrasonic wave-based indoor inertial navigation mapping system. The mapping system includes: a first inertial navigation module, a first ultrasonic ranging module, a first air pressure detection module, a first control module, and a first wireless communication module arranged at a left foot of a person; a second inertial navigation module, a second ultrasonic ranging module, a second air pressure detection module, a second control module, and a second wireless communication module arranged at a right foot of a person; and a terminal module, connected to the first control module through the first wireless communication module, and connected to the second control module through the second wireless communication module. Referring to FIG. 1, the method specifically includes step 110-step 150.

In step 110, inertial navigation data, ultrasonic data, and altitude data of the person for each step are acquired.

Exemplarily, assuming that a person enters a room where the fire occurs, the first inertial navigation module, the first ultrasonic ranging module, and the first air pressure detection module are arranged on a vamp of the left foot of the person. The first inertial navigation module is configured for detecting the inertial navigation data of the left foot of the person for each step. The first ultrasonic ranging module is configured for detecting the ultrasonic data of the left foot of the person for each step. The first air pressure detection module is configured for detecting the altitude data of the left foot of the person for each step. Similarly, the second inertial navigation module, the second ultrasonic ranging module, and the second air pressure detection module are arranged on a vamp of the right foot of the person. The second inertial navigation module is configured for detecting the inertial navigation data of the right foot of the person for each step. The second ultrasonic ranging module is configured for detecting the ultrasonic data of the right foot of the person for each step. The second air pressure detection module is configured for detecting the altitude data of the right foot of the person for each step. Therefore, the inertial navigation data, the ultrasonic data, and the altitude data of the person for each step during walking may be acquired.

In step 120, a landing point position of a corresponding footstep is determined according to the inertial navigation data and the altitude data for each step, and all landing point positions are connected to obtain a reference trajectory.

A step length and a step direction for each step may be determined according to the inertial navigation data for each step, and then a landing point position for each step may be determined in combination with the altitude data for each step. The landing point positions are footstep positions as shown in FIG. 2. Based on this method, the landing point positions corresponding to all steps that the person walks through may be determined, and all landing point positions are connected to from a reference trajectory, such as a reference trajectory formed by connecting three footstep positions (20a, 20b, 20c) shown in FIG. 2.

In step 130, each initial ultrasonic map point is determined according to the reference trajectory and the ultrasonic data for each step. Each initial ultrasonic map point corresponds to one piece of feature data. The feature data of each initial ultrasonic map point (e.g. 22a, 24a; 22b, 24b; 22c, 24c, . . . , etc. for ultrasonic map point left side and right side, respectively) is recorded and stored.

The reference trajectory consists of the landing point positions for all steps that the person walks through. Since the ultrasonic ranging module can detect the distance of an obstacle in front of the module, and since the ultrasonic ranging module can work relatively stably in harsh environment such as smoke, the initial ultrasonic map point of the corresponding footstep can be determined according to the ultrasonic data for each step and the landing point position for each step, such as the ultrasonic map point shown in FIG. 2, and then the edge of an obstacle avoidance channel can be planned according to each step that the person walks through. The initial ultrasonic map point for each step has corresponding feature data. The feature data for each step may include atmospheric pressure data, magnetic field distribution data, motion logic feature data, etc. for each step. In order to facilitate subsequent processing, each initial ultrasonic map point and corresponding feature data are recorded and stored.

In step 140, current initial ultrasonic map point and current feature data corresponding to a current footstep are acquired.

Specifically, the initial ultrasonic map point corresponding to each step that the person walks through is calculated according to the method provided by the abovementioned step. Each initial ultrasonic map point has its corresponding feature data. In order to ensure the safety of the personnel entering a harsh indoor environment, for example, to ensure that the personnel returns according to an original route or walks or returns according to a previously walked and safe route, current initial ultrasonic map point corresponding to a current footstep of the personnel is acquired, and corresponding current feature data is acquired, which facilitates comparison with the recorded and stored data, thereby ensuring the safety of the person walking.

In step 150, the current feature data is compared with all recorded and stored feature data. If a preset condition is satisfied, the current initial ultrasonic map point is fused with various initial ultrasonic map points with similar features by a particle filter algorithm.

The feature data corresponding to each initial ultrasonic map point may represent basic attributes of the corresponding initial ultrasonic map point and may be configured for distinguishing other initial ultrasonic map points. The current feature data is compared with all recorded and stored feature data, and the person continues walking forward if the preset condition is not satisfied. If the preset condition is satisfied, it indicates that there is feature data similar to the current feature data in all stored and record feature data, and it also indicates that there is a map point located at the same or very close geographical position to the current initial ultrasonic map point in the initial ultrasonic map points corresponding to all stored and recorded feature data. Therefore, it indicates that the current initial ultrasonic map point is a safe return-to-walk point (for example, a return in the same route). Therefore, the current initial ultrasonic map point is fused with various initial ultrasonic map points with similar features, that is, the overlapped map points are fused, so that the personnel is guided to return according to the original route or walk according to a safe route that has been walked previously.

In the technical solution of the present embodiment, the working principle of the ultrasonic wave-based indoor inertial navigation mapping method is as follows. Referring to FIG. 1, first, inertial navigation data, ultrasonic data, and altitude data of a person for each step are acquired; a landing point position of a corresponding footstep is determined according to the inertial navigation data and the altitude data for each step, and all landing point positions are connected to obtain a reference trajectory; each initial ultrasonic map point is determined according to the reference trajectory and the ultrasonic data for each step, where each initial ultrasonic map point corresponds to one piece of feature data the feature data of each initial ultrasonic map point is recorded and stored; a current initial ultrasonic map point and current feature data corresponding to a current footstep are acquired; and the current feature data is compared with all recorded and stored feature data, and the current initial ultrasonic map point is fused with various initial ultrasonic map points with similar features by a particle filter algorithm if a preset condition is satisfied. Therefore, a reference trajectory is determined according to each step that the person walks through, and the initial ultrasonic map point and corresponding feature data for each step are determined; then, the current feature data is compared with all recorded and stored feature data; if the preset condition is satisfied, then it indicates that there is a map point located at the same or very close geographical position to the current initial ultrasonic map point in the initial ultrasonic map points corresponding to all stored and recorded feature data. Therefore, it indicates that the current initial ultrasonic map point is a safe return-to-walk point (for example, a return in the same route). Therefore, the current initial ultrasonic map point is fused with various initial ultrasonic map points with similar features, that is, the overlapped map points are fused, so that the person is guided to return according to the original route or walk according to a safe route that has been walked previously. Therefore, an indoor map is constructed, and a clear indoor traveling trajectory map is provided for personnel in harsh environment such as a fire room and mine tunnel collapse, so as to protect the life safety of the personnel, and in turn ensure smooth running of a rescue work.

In the technical solution of the present embodiment, an ultrasonic wave-based indoor inertial navigation mapping method is provided. The method is performed by an ultrasonic wave-based indoor inertial navigation mapping system. The mapping system includes: a first inertial navigation module, a first ultrasonic ranging module, a first air pressure detection module, a first control module, and a first wireless communication module arranged at a left foot of a person; a second inertial navigation module, a second ultrasonic ranging module, a second air pressure detection module, a second control module, and a second wireless communication module arranged at a right foot of a person; and a terminal module, connected to the first control module through the first wireless communication module, and connected to the second control module through the second wireless communication module. The method includes: acquiring inertial navigation data, ultrasonic data, and altitude data of a person for each step; determining a landing point position of a corresponding footstep according to the inertial navigation data and the altitude data for each step, and connecting all landing point positions to obtain a reference trajectory; determining each initial ultrasonic map point according to the reference trajectory and the ultrasonic data for each step, where each initial ultrasonic map point corresponds to one piece of feature data, the feature data of each initial ultrasonic map point is recorded and stored; acquiring a current initial ultrasonic map point and current feature data corresponding to a current footstep; comparing the current feature data with all recorded and stored feature data, and fusing the current initial ultrasonic map point with various initial ultrasonic map points with similar features by a particle filter algorithm, if a preset condition is satisfied. By the method, an indoor map can be constructed, and a clear indoor traveling trajectory map is provided for personnel in harsh environment such as a fire room and mine tunnel collapse, so as to protect their life safety, and in turn ensure smooth running of a rescue work.

On the basis of the abovementioned technical solution, optionally, the feature data at least includes atmospheric pressure data and magnetic fingerprint feature data. The magnetic fingerprint feature data includes motion logic feature data and topology structure data.

Generally, a magnetic field distribution in an indoor scene is affected by steel structure objects such steel bars, elevators or natural magnets, and has obvious frequency domain characteristics of magnetometer signals at specific positions. The change of the inertial data regarding the walking trajectory of a wearer also has obvious laws at positions of corners, stairs, and obstacles. In addition, due to the closure and relative stability of an indoor structure, a trajectory of a fireman is blocked by obstacles such as an external façade, a stairwell and a gate, and turns backwards, and returns to an original position after exploring the way around a rectangular-ambulatory-plane corridor. These significant and regular feature tags such as the atmospheric pressure data, the magnetic fingerprint feature data, the motion logic feature data, and the topology structure data can be used as auxiliary discrimination for feature learning. Therefore, this type of data with geographical characteristics and kinematic logic characteristics is taken as training data, and outstanding characteristics thereof are learned as online learning dictionary set, which is encoded and stored in the form of a database. An example of a storage mode is as follows.

The initial ultrasonic map point itself has altitude and plane (for example, x, y) coordinates. Each magnetic field frequency domain distribution signal obtained by magnetic fingerprint learning can be stored in a structure, and is labeled as 1-n. Inertial features mainly mark the motion direction of the footstep where the ultrasonic map points are located. Motion logic features mainly draw a motion topology structural diagram from an initial position to the current position, which is used for identifying following situation: for example. "returning to the current position from a corridor in the original route" or "returning to the initial position after a walking in a circle", and is used for clarifying the occurrence sequence and the topological relationship of the initial ultrasonic map points at adjacent positions. These characteristics are assigned to the initial ultrasonic map points for distinguishing various corresponding indoor building structures. Corresponding atmospheric pressure data, magnetic fingerprint feature data, inertial data, and motion logic feature data of each initial ultrasonic map point will be obtained.

The atmospheric pressure data may be acquired by an air pressure detection module. An inertial navigation module may be a nine-axis Inertial Measurement Unit (IMU), which includes a magnetometer. The magnetic fingerprint feature data may be acquired by the magnetometer therein.

Optionally, the comparing the current feature data with all recorded and stored feature data includes:

determining whether the atmospheric pressure data of the current feature data is matched with the atmospheric pressure data of all recorded and stored feature data; if the atmospheric pressure data of the current feature data is matched with the atmospheric pressure data of all recorded and stored feature data, determining whether the magnetic fingerprint feature data of the current feature data is matched with the magnetic fingerprint feature data of all recorded and stored feature data; if the magnetic fingerprint feature data of the current feature data is matched with the magnetic fingerprint feature data of all recorded and stored feature data, determining whether the motion logic feature data and the topology structure data of the current feature data satisfy a preset condition; and if the preset condition is satisfied, fusing the current initial ultrasonic map point with various initial ultrasonic map points with similar features by a particle filter algorithm.

Specifically, first, it is determined whether the atmospheric pressure data of the current feature data is matched with the atmospheric pressure data of all recorded and stored feature data. If the atmospheric pressure data of the current feature data is not matched with the atmospheric pressure data of all recorded and stored feature data, then it indicates that there is no similar atmospheric pressure data feature recorded, and codes of the current magnetic fingerprint feature data is stored and the person continues to walk forward; if the atmospheric pressure data of the current feature data is matched with the atmospheric pressure data of all recorded and stored feature data, then it indicates that there is similar atmospheric pressure data feature recorded, and further, it is determined whether the magnetic fingerprint feature data of the current feature data is matched with the magnetic fingerprint feature data of the recorded and stored feature data. If the magnetic fingerprint feature data of the current feature data is not matched with the magnetic fingerprint feature data of the recorded and stored feature data, then it indicates that there is no similar magnetic fingerprint feature data recorded, and codes of the current magnetic fingerprint feature data are stored, and the person continues to walk forward. If the magnetic fingerprint feature data of the current feature data is matched with the magnetic fingerprint feature data of the recorded and stored feature data, then it indicates that there is similar magnetic fingerprint feature data recorded, and further, whether the motion logic feature data and the topology structure data of the current feature data satisfy a preset condition is determined. For example, according to the motion logic feature data and the topology structure data of the current feature data, the distribution position of the current initial ultrasonic map point is compared with the distribution position of the recorded and stored initial ultrasonic map points with similar features; if the positions are close, then it indicates that these map points are distributed at the position in the same area, that is, in the same geographical position; and the current initial ultrasonic map point is fused with various initial ultrasonic map points with similar features by a particle filter algorithm, that is, the overlapped map points are fused, so that the personnel are guided to return according to the original route or walk according to a safe route that has been walked previously. If the positions are far, codes of the current magnetic fingerprint feature data are stored and the person continues to walk forward.

Optionally, the atmospheric pressure data includes first atmospheric pressure data acquired by the first air pressure detection module and second atmospheric pressure data acquired by the second air pressure detection module.

Optionally, the atmospheric pressure data for each step that the person walks through may be data of the left foot, or may also be data of the right foot. The atmospheric pressure data for each step may be first atmospheric pressure data acquired by the first air pressure detection module and second atmospheric pressure data acquired by the second air pressure detection module.

Optionally, the first inertial navigation module at least includes a first magnetometer, and the second inertial navigation module at least includes a second magnetometer. The magnetic fingerprint feature data includes first magnetic fingerprint feature data acquired by the first magnetometer and second magnetic fingerprint feature data acquired by the second magnetometer.

The magnetic fingerprint feature data for each step that the person walks through may be data of the left foot, or may also be data of the right foot. Therefore, the magnetic fingerprint feature data for each step may be first magnetic fingerprint feature data acquired by the first magnetometer and second magnetic fingerprint feature data acquired by the second magnetometer.

Optionally, the first inertial navigation module at least includes a first accelerometer and a first gyroscope. The second inertial navigation module at least includes a second accelerometer and a second gyroscope.

The inertial navigation data includes acceleration data and gyroscope data. The acceleration data includes a first acceleration acquired by the first accelerometer and a second acceleration acquired by the second accelerometer. The gyroscope data includes first gyroscope data acquired by the first gyroscope and second gyroscope data acquired by the second gyroscope.

The determining the landing point position of the corresponding footstep according to the inertial navigation data and the altitude data for each step includes:

determining a step length according to the acceleration data for each step;

determining a walking direction according to the gyroscope data for each step; and determining a landing point position for each step according to the step length, the walking direction, and the altitude for each step.

Specifically, in the process of walking, there is a significant periodic change law of the footstep from leg lifting to foot landing. Based on the acceleration data for each step, a waveform diagram of the acceleration in a time order can be obtained. Based on the waveform diagram, a wave trough of a filtered acceleration modulus is solved, and the time stamp of the position where the wave trough is located is used as a time domain position of the footstep. Based on the waveform diagram, the step length can be calculated by calculating information, such as the standard deviation of the acceleration between footsteps and time difference between footsteps.

According to the gyroscope data for each step, an obvious pulse peak of the gyroscopes in the walking process of the feet is captured as a steering determination basis, and the current walking direction is determined cumulatively in combination with the heading angle data output by an inertial sensor.

Finally, starting from an initial position, the landing point positions for each footstep in a three-dimensional coordinate system can be calculated by using the step length, the walking direction, and the altitude in time order. The landing point positions are connected in sequence to obtain a reference trajectory.

Optionally, the ultrasonic data for each step includes first ultrasonic data acquired by the first ultrasonic ranging module for each step and second ultrasonic data acquired by the second ultrasonic ranging module for each step.

The determining each initial ultrasonic map point according to the reference trajectory and the ultrasonic data for each step includes:

fusing the reference trajectory and the first ultrasonic data for each step to obtain an initial ultrasonic map point of the left foot of the person for each step; and fusing the reference trajectory and the second ultrasonic data for each step to obtain an initial ultrasonic map point of the right foot of the person for each step.

Further, the ultrasonic data for each step that the person walks through may be data of the left foot or may be data of the right data. Therefore, the ultrasonic data for each step may be the first ultrasonic data acquired by the first ultrasonic ranging module and the second ultrasonic data acquired by the second ultrasonic ranging module.

The reference trajectory consists of the landing point position of each step that the person walks through, and the landing point position for each step are determined by the inertial navigation data and the altitude data for each step. Since the ultrasonic ranging module can work relatively stably in harsh environment such as smoke, the initial ultrasonic map point of the corresponding footstep can be determined according to the ultrasonic data for each step and the landing point position of each step. Since the left foot of the person is provided with the first ultrasonic ranging module, and the right foot of the person is provided with the second ultrasonic ranging module, the ultrasonic data for each step includes the first ultrasonic data acquired by the first ultrasonic ranging module and the second ultrasonic data acquired by the second ultrasonic ranging module. Correspondingly, the initial ultrasonic map point of the left foot for each step can be determined according to the first ultrasonic data of the left foot and the corresponding landing point position (or the reference trajectory), and the initial ultrasonic map point of the right foot for each step can be determined according to the second ultrasonic data of the right foot and the corresponding landing point position (or the reference trajectory).

Optionally, after the current feature data is compared with all recorded and stored feature data, the method further includes: visualizing all initial map points.

Specifically, according to a mapping principle of a grid map, a Bresenham straight line from a sampling point to a finally determined ultrasonic map point is drawn. The pixel area covered by the straight line is defined as an occupied area. Each pixel may be covered by a plurality of Bresenham straight lines. By determining the number of repeatedly occupied pixels and the occupancy rate of occupied grid map, the environmental data around the trajectory is determined, and redundant ultrasonic map points in some overlapping parts are eliminated. Pixels in the part with a pixel occupancy rate of more than 80% are designated as white, pixels in the part with a pixel occupancy rate of less than 30% are designated as black, and pixels in the part with a pixel occupancy rate of 30% to 80% are designated as gray. Finally, the global 3D grid map is visualized.

In addition, a display module, for example, a display device, such as a display screen and a visual bracelet, is arranged to display mapping results, such as the initial ultrasonic map points and fusion points, so as to facilitate relevant personnel to view in time, thereby ensuring their safe walking indoors.

Optionally, the inertial navigation data and the altitude data for each step include first inertial navigation data acquired by the first inertial navigation module and first altitude data acquired by the first air pressure detection module of the left foot, and second inertial navigation data acquired by the second inertial navigation module and second altitude data acquired by the second air pressure detection module of the right foot.

The inertial navigation data and the altitude data for each step that the person walks through may be data of the left foot or may be data of the right foot. Therefore, the inertial navigation data for each step may be first inertial navigation data acquired by a first inertial navigation module 101 and second inertial navigation data acquired by a second inertial navigation module 102. The altitude data for each step may be first altitude data acquired by a first air pressure detection module 103 and second altitude data acquired by a second air pressure detection module 203.

Figure 3:
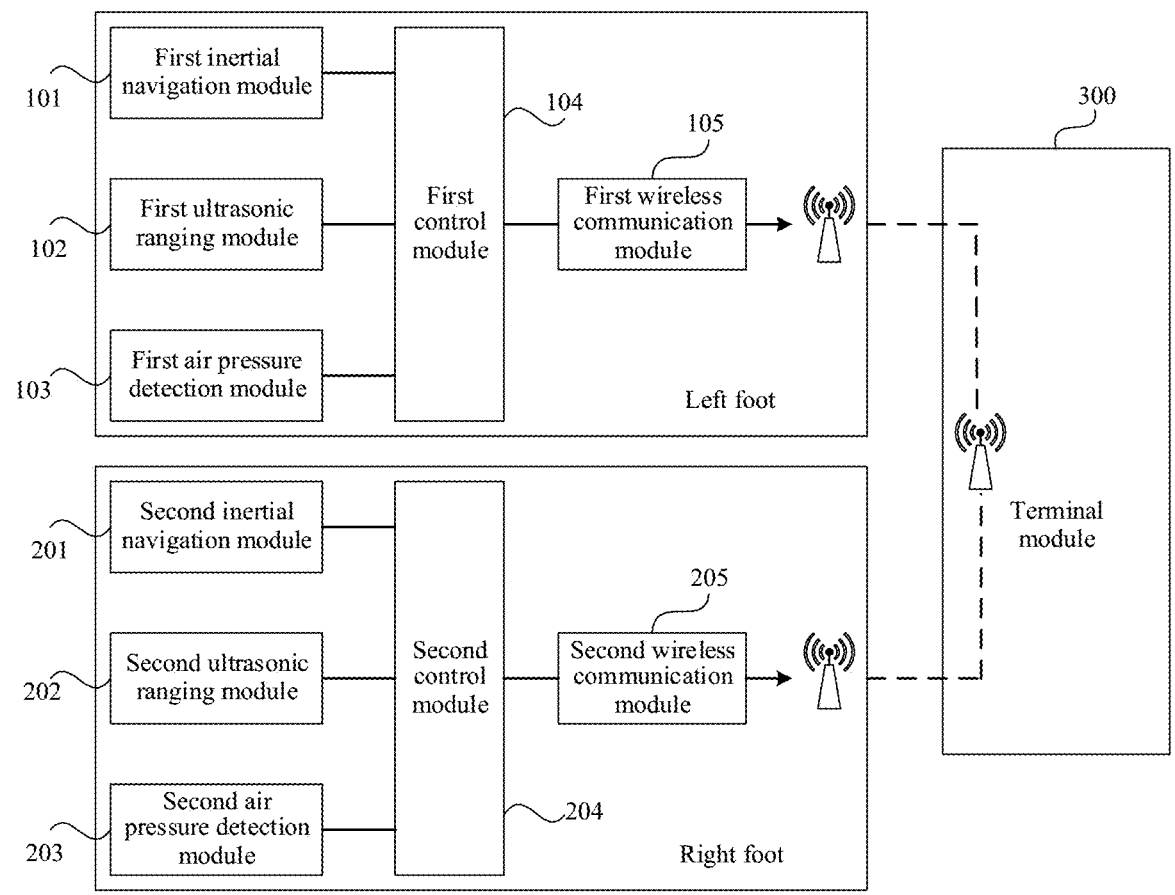
FIG. 3 is a structural block diagram of an ultrasonic wave-based indoor inertial navigation mapping system in an embodiment of the present disclosure.
Figure 4A:
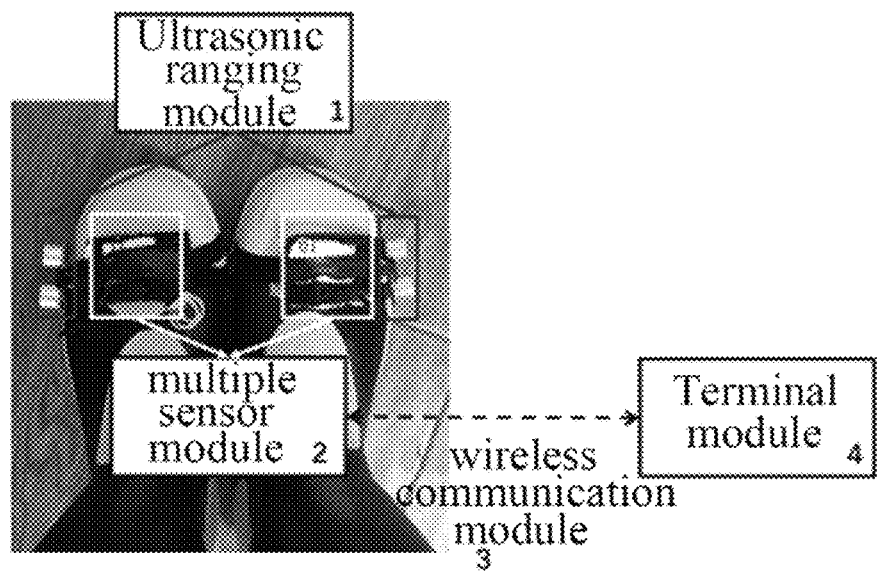
FIG. 4A-4B show an installation schematic diagram of some sensors in the embodiment of the present disclosure.
Figure 4B:
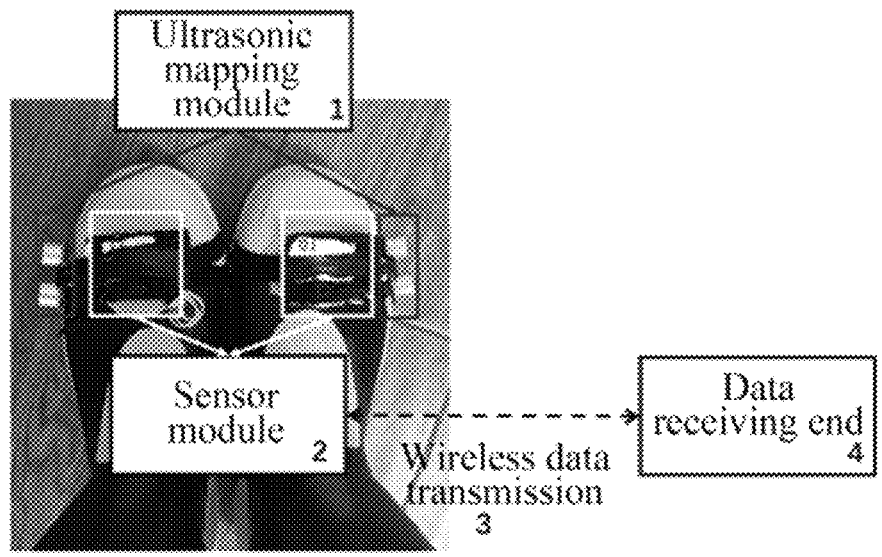

FIG. 3 is a structural block diagram of an ultrasonic wave-based indoor inertial navigation mapping system provided by an embodiment of the present disclosure. FIG. 4A-4B show an installation schematic diagram of some sensors provided by the embodiment of the present disclosure. The embodiment of the present disclosure provides an ultrasonic-based indoor inertial navigation mapping system. Referring to FIG. 3, the ultrasonic wave-based indoor inertial navigation mapping system includes: a first inertial navigation module 101, a first ultrasonic ranging module 102, a first air pressure detection module 103, a first control module 104, and a first wireless communication module 105 arranged on a left foot of a person; a second inertial navigation module 201, a second ultrasonic ranging module 202, a second air pressure detection module 203, a second control module 204, and a second wireless communication module 205 arranged on a right foot of the person; and a terminal module 300, which is connected to the first control module 104 through the first wireless communication module 105 and connected to the second control module 204 through the second wireless communication module 205.

The terminal module 300 is configured for: acquiring inertial navigation data, ultrasonic data, and altitude data of the person for each step;

determining a landing point position of a corresponding footstep according to the inertial navigation data and the altitude data for each step, and connecting all landing point positions to obtain a reference trajectory;

determining each initial ultrasonic map point according to the reference trajectory and the ultrasonic data for each step, where each initial ultrasonic map point corresponds to a piece of feature data, and the feature data of each initial ultrasonic map point is recorded and stored.

acquiring a current initial ultrasonic map point and current feature data corresponding to a current footstep;

comparing the current feature data with all recorded and stored feature data, and fusing the current initial ultrasonic map point with various initial ultrasonic map points with similar features by a particle filter algorithm if a preset condition is satisfied.

The first inertial navigation module 101 is configured for detecting and obtaining the first inertial navigation data of the left foot and transmitting the first inertial navigation data to the first control module 104. The first control module 104 performs processing, such as filtering and denoising, on the first inertial navigation data and then transmits the first inertial navigation data to the terminal module 300 through the first wireless communication module 105. The first ultrasonic ranging module 102 is configured for detecting and obtaining the first ultrasonic data of the left foot and transmitting the first ultrasonic data to the first control module 104. The first control module 104 performs processing, such as filtering and denoising, on the first ultrasonic data and then transmits the first ultrasonic data to the terminal module 300 through the first wireless communication module 105. The first air pressure detection module 103 is configured for detecting and obtaining the first atmospheric pressure data and the first altitude data of the left foot, and transmitting the first atmospheric pressure data and the first altitude data to the first control module 104. The first control module 104 performs processing, such as filtering and denoising, on the first atmospheric pressure data and the first altitude data, and transmits the first atmospheric pressure data and the first altitude data to the terminal module 300 through the first communication module 105.

The second inertial navigation module 201 is configured for detecting and obtaining the second inertial navigation data of the right foot and transmitting the second inertial navigation data to the second control module 204. The second control module 204 performs processing, such as filtering and denoising, on the second inertial navigation data and then transmits the second inertial navigation data to the terminal module 300 through the second wireless communication module 205. The second ultrasonic ranging module 202 is configured for detecting and obtaining the second ultrasonic data of the right foot and transmitting the second ultrasonic data to the second control module 204. The second control module 204 performs processing, such as filtering and denoising, on the second ultrasonic data and then transmits the second ultrasonic data to the terminal module 300 through the second wireless communication module 205. The second air pressure detection module 203 is configured for detecting and obtaining the second atmospheric pressure data and the second altitude data of the right foot, and transmitting the second atmospheric pressure data and the second altitude data to the second control module 204. The second control module 204 performs processing, such as filtering and denoising, on the second atmospheric pressure data and the second altitude data, and transmits the second atmospheric pressure data and the second altitude data to the terminal module 300 through the second communication module 205.

The first inertial navigation module 101 and the second inertial navigation module 201 may be nine-axis IMU sensors, such as inertial sensor chips (IMU) BNO055, which are respectively mounted on an outer side of a vamp of the left foot and an outer side of a vamp of the right foot. As shown in FIG. 3, the first ultrasonic ranging module 102 and the second ultrasonic ranging module 202 may be ultrasonic sensors, such as ultrasonic ranging modules HC-SR04, which are respectively mounted on the outer side of the vamp of the left foot and the outer side of the vamp of the right foot. As shown in FIG. 3, the first air pressure detection module 103 and the second air pressure detection module 203 may be barometers, such as barometer modules BMP280. The first control module 104 and the second control module 204 may be single chip micro-computers such as Micro Control Units (MCU) Seeeduino XIAO. The first communication module 105 and the second communication module 205 may be wireless transmission transmitter modules Long Range Radio (LoRa), which adopt a wireless transmission protocol for transmitting data. At present, LoRa is mainly considered as a main wireless transmission protocol. More stable and more cost-effective solutions such as the new generation WLAN protocol may also be referred and used, which can be set according to the actual situation. No specific limits are made thereto here. In addition; the system further includes a power supply module, such as a 1000 milliampere hour (mAh) lithium battery pack, which is configured for supplying power for each sensor.

FIG. 4A-4B show an installation schematic diagram of some sensors in the embodiment of the present disclosure. This disclosure includes ultrasonic ranging module 1, multiple sensor module 2 (navigation module, air pressure detection module and control module), wireless communication module 3 for wireless data transmission and terminal module 4 for wireless transmission of data from the sensor module to the data receiving end, as described in FIG. 3.

The inertial navigation data, the ultrasonic data, and the altitude data for each step that the person walks through may be data of the left foot or may also be data of the right foot. Therefore, the inertial navigation data for each step may be first inertial navigation data acquired by the first inertial navigation module 101 and second inertial navigation data acquired by the second inertial navigation module 201. The ultrasonic data for each step may be first ultrasonic data acquired by the first ultrasonic ranging module 102 and second ultrasonic data acquired by the second ultrasonic ranging module 202. The altitude data for each step may be first altitude data acquired by the first air pressure detection module 103 and second altitude data acquired by the second air pressure detection module 203.

In the technical solution of the present embodiment, an ultrasonic wave-based indoor inertial navigation mapping system is provided. The ultrasonic wave-based indoor inertial navigation mapping system includes: a first inertial navigation module, a first ultrasonic ranging module, a first air pressure detection module, a first control module, and a first wireless communication module arranged at a left foot of a person; a second inertial navigation module, a second ultrasonic ranging module, a second air pressure detection module, a second control module, and a second wireless communication module arranged at a right foot of the person; and a terminal module, connected to the first control module through the first wireless communication module, and connected to the second control module through the second wireless communication module. The terminal module is configured for: acquiring inertial navigation data, ultrasonic data, and altitude data of the person for each step; determining a landing point position of a corresponding footstep according to the inertial navigation data and the altitude data for each step, and connecting all landing point positions to obtain a reference trajectory; determining each initial ultrasonic map point according to the reference trajectory and the ultrasonic data for each step, where each initial ultrasonic map point corresponds to a piece of feature data; the feature data of each initial ultrasonic map point is recorded and stored; acquiring a current initial ultrasonic map point and current feature data corresponding to a current footstep; and comparing the current feature data with all recorded and stored feature data, and fusing the current initial ultrasonic map point with various initial ultrasonic map points with similar features by a particle filter algorithm if a preset condition is satisfied. By the system, an indoor map can be constructed, a clear indoor traveling trajectory map for personnel in harsh environments such as a fire room and mine tunnel collapse is provided, so as to guarantee the life safety of the personnel, and in turn ensure smooth running of a rescue work.

The ultrasonic wave-based indoor inertial navigation mapping system provided by the embodiments of the present disclosure may perform the ultrasonic wave-based indoor inertial navigation mapping method provided by any embodiment of the present disclosure, and has functional modules corresponding to the execution method and beneficial effects.

It is noted that the above are only preferred embodiments of the present disclosure and the technical principles applied thereto. Those skilled in the art will appreciate that the present disclosure is not limited to the specific embodiments described herein, and various significant changes, re-adjustments and substitutions can be made by those skilled in the art without departing from the scope of protection of the present disclosure. Therefore, the present disclosure has been described in detail by the above embodiments, but the present disclosure is not limited to the above embodiments, and more other equivalent embodiments may be included without departing from the concept of the present disclosure. The scope of the present disclosure is determined by the scope of the appended claims.

What is claimed is:

1. An ultrasonic wave-based indoor inertial navigation mapping method, wherein the method is performed by an ultrasonic wave-based indoor inertial navigation mapping system, which comprises: a first inertial navigation module, a first ultrasonic ranging module, a first air pressure detection module, a first control module, and a first wireless communication module arranged at a left foot of a person; a second inertial navigation module, a second ultrasonic ranging module, a second air pressure detection module, a second control module, and a second wireless communication module arranged at a right foot of the person; a terminal module, connected to the first control module through the first wireless communication module, and connected to the second control module through the second wireless communication module; and a display device for carrying by the person;

the mapping method comprising:
acquiring, by the first and second inertial navigation modules, inertial navigation data of the person for each step; acquiring, by the first and second ultrasonic ranging modules, ultrasonic data of the person for each step; and acquiring, by the first and second air pressure detection modules, altitude data of the person for each step;
transmitting, by the first and second control modules via the first and second wireless communication modules, the inertial navigation data, ultrasonic data and altitude data of the person for each step to the terminal module;
determining, by the terminal module, a landing point position of a corresponding footstep according to the inertial navigation data and the altitude data for each step, and connecting all landing point positions to obtain a reference trajectory;
determining, by the terminal module, each initial ultrasonic map point according to the reference trajectory and the ultrasonic data for each step, wherein each initial ultrasonic map point corresponds to a piece of feature data, and the feature data of each initial ultrasonic map point is recorded and stored; wherein the feature data at least comprises atmospheric pressure data and magnetic fingerprint feature data; and the magnetic fingerprint feature data comprises motion logic feature data and topology structure data;
acquiring, by the terminal module, a current initial ultrasonic map point and current feature data corresponding to a current footstep;
determining, by the terminal module, whether atmospheric pressure data of the current feature data is matched with atmospheric pressure data of all recorded and stored feature data; when the atmospheric pressure data of the current feature data is matched with the atmospheric pressure data of all recorded and stored feature data, determining whether magnetic fingerprint feature data of the current feature data is matched with magnetic fingerprint feature data of all recorded and stored feature data;
when the magnetic fingerprint feature data of the current feature data is matched with the magnetic fingerprint feature data of all recorded and stored feature data, determining whether motion logic feature data and topology structure data of the current feature data satisfy a preset condition; and wherein upon the preset condition being satisfied, fusing the current initial ultrasonic map point with various initial ultrasonic map points with similar feature data by a particle filter algorithm to obtain a fusing result; wherein the preset condition is that a distribution position of the current initial ultrasonic map point is located in a same area as distribution positions of the various initial ultrasonic map points with similar feature data in the reference trajectory; and
guiding, by the display device, the person to safely walk indoors based on the fusing result and the reference trajectory.

2. The method according to claim 1, wherein the atmospheric pressure data comprises first atmospheric pressure data acquired by the first air pressure detection module and second atmospheric pressure data acquired by the second air pressure detection module.

3. The method according to claim 1, wherein the first inertial navigation module at least comprises a first magnetometer; the second inertial navigation module at least comprises a second magnetometer; and the magnetic fingerprint feature data comprises first magnetic fingerprint feature data acquired by the first magnetometer and second magnetic fingerprint feature data acquired by the second magnetometer.

4. The method according to claim 1, wherein:
the first inertial navigation module at least comprises a first accelerometer and a first gyroscope;
the second inertial navigation module at least comprises a second accelerometer and a second gyroscope;
the inertial navigation data comprises acceleration data and gyroscope data;
the acceleration data comprises a first acceleration acquired by the first accelerometer and a second acceleration acquired by the second accelerometer;
the gyroscope data comprises first gyroscope data acquired by the first gyroscope and second gyroscope data acquired by the second gyroscope; and
wherein the determining the landing point position of the corresponding footstep according to the inertial navigation data and the altitude data for each step comprises:

determining step length according to the acceleration data for each step;

determining a walking direction according to the gyroscope data for each step; and determining a landing point position of each step according to the step length, the walking direction, and the altitude for each step.

5. The method according to claim 1, wherein the ultrasonic data for each step comprises first ultrasonic data acquired by the first ultrasonic ranging module and second ultrasonic data acquired by the second ultrasonic ranging module;

wherein determining each initial ultrasonic map point according to the reference trajectory and the ultrasonic data for each step comprises:

fusing the reference trajectory and the first ultrasonic data for each step to obtain an initial ultrasonic map point of the left foot of the person for each step; and fusing the reference trajectory and the second ultrasonic data for each step to obtain an initial ultrasonic map point of the right foot of the person for each step.

6. The method according to claim 1, the method further comprising visualizing all initial map points after comparing the current feature data with all recorded and stored feature data.

7. The method according to claim 1, wherein the inertial navigation data and the altitude data for each step comprises first inertial navigation data acquired by the first inertial navigation module and first altitude data acquired by the first air pressure detection module on the left foot of the person; and second inertial navigation data acquired by the second inertial navigation module and second altitude data acquired by the second air pressure detection module on the right foot of the person.

8. An ultrasonic wave-based indoor inertial navigation mapping system, comprising: a first inertial navigation module, a first ultrasonic ranging module, a first air pressure detection module, a first control module, and a first wireless communication module arranged at a left foot of a person; a second inertial navigation module, a second ultrasonic ranging module, a second air pressure detection module, a second control module, and a second wireless communication module arranged at a right foot of the person; a terminal module, connected to the first control module through the first wireless communication module, and connected to the second control module through the second wireless communication module; and a display device for carrying by the person, wherein:

the first and second inertial navigation modules are configured for acquiring inertial navigation data of the person for each step;

the first and second ultrasonic ranging modules are configured for acquiring ultrasonic data of the person for each step;

the first and second air pressure detection modules are configured for altitude data of the person for each step;

the first and second control modules are configured for transmitting the inertial navigation data, ultrasonic data and altitude data of the person for each step via the first and second wireless communication modules to the terminal module;

wherein the terminal module is configured for:

determining a landing point position of a corresponding footstep according to the inertial navigation data and the altitude data for each step, and connecting all landing point positions to obtain a reference trajectory;

determining each initial ultrasonic map point according to the reference trajectory and the ultrasonic data for each step, wherein each initial ultrasonic map point corresponds to a piece of feature data, and the feature data of each initial ultrasonic map point is recorded and stored; wherein the feature data at least comprises atmospheric pressure data and magnetic fingerprint feature data; and the magnetic fingerprint feature data comprises motion logic feature data and topology structure data;

acquiring a current initial ultrasonic map point and current feature data corresponding to a current footstep;

determining whether atmospheric pressure data of the current feature data is matched with atmospheric pressure data of all recorded and stored feature data; when the atmospheric pressure data of the current feature data is matched with the atmospheric pressure data of all recorded and stored feature data, determining whether magnetic fingerprint feature data of the current feature data is matched with magnetic fingerprint feature data of all recorded and stored feature data;

when the magnetic fingerprint feature data of the current feature data is matched with the magnetic fingerprint feature data of all recorded and stored feature data, determining whether motion logic feature data and topology structure data of the current feature data satisfy a preset condition; and wherein upon the preset condition being satisfied, fusing the current initial ultrasonic map point with various initial ultrasonic map points with similar feature data by a particle filter algorithm to obtain a fusing result; wherein the preset condition is that a distribution position of the current initial ultrasonic map point is located in a same area as distribution positions of the various initial ultrasonic map points with similar feature data in the reference trajectory; and wherein the display device is configured for displaying the fusing result and the reference trajectory to the person for guiding the person to safely walk indoors.

* * * * *